(12) United States Patent
Bingham et al.

(10) Patent No.: US 6,183,348 B1
(45) Date of Patent: *Feb. 6, 2001

(54) METHODS AND APPARATUSES FOR CUTTING, ABRADING, AND DRILLING

(75) Inventors: Dennis N. Bingham, Idaho Falls; Richard C. Swainston, Preston; Gary L. Palmer, Shelley; Russell L. Ferguson, Idaho Falls, all of ID (US)

(73) Assignee: Bechtel BWXT Idaho, LLC, Idaho Falls, ID (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/056,595

(22) Filed: Apr. 7, 1998

(51) Int. Cl.[7] .................................................. B24C 1/00
(52) U.S. Cl. ................................ 451/37; 451/39; 451/65; 83/219
(58) Field of Search ................................ 451/37, 57, 65, 451/461, 39, 40, 53, 54, 75, 80; 83/219

(56) References Cited

U.S. PATENT DOCUMENTS

| 5,341,608 | * | 8/1994 | Mains, Jr. | 451/39 |
| 5,390,450 | * | 2/1995 | Goenka | 451/75 |
| 5,571,335 | * | 11/1996 | Lioyd | 451/39 X |
| 5,759,086 | * | 6/1998 | Klingel | 451/40 X |

* cited by examiner

Primary Examiner—David A. Scherbel
Assistant Examiner—Anthony Ojini
(74) Attorney, Agent, or Firm—Wells St John Roberts Gregory & Matkin

(57) ABSTRACT

Methods and apparatuses for treating a surface of a work piece are described. In one implementation, a laser delivery subsystem is configured to direct a laser beam toward a treatment zone on a work surface. A cryogenic material delivery subsystem is operably coupled with the laser delivery subsystem and is configured to direct a stream comprising cryogenic material toward the treatment zone. Both the laser beam and stream cooperate to treat material of the work surface within the treatment zone. In one aspect, a nozzle assembly provides the laser beam and stream of cryogenic material along a common flow axis. In another aspect, the laser beam and stream are provided along different axes.

2 Claims, 6 Drawing Sheets

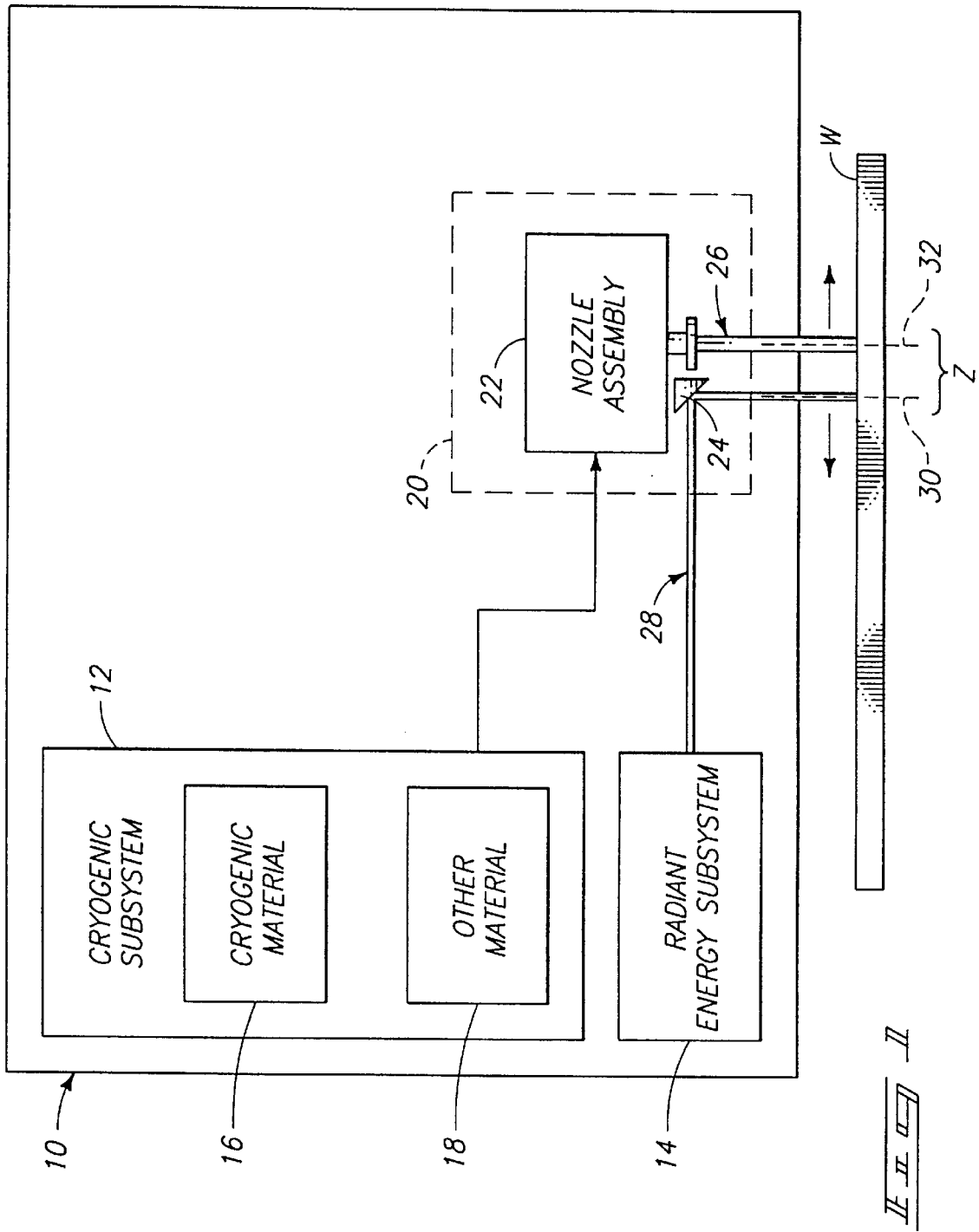

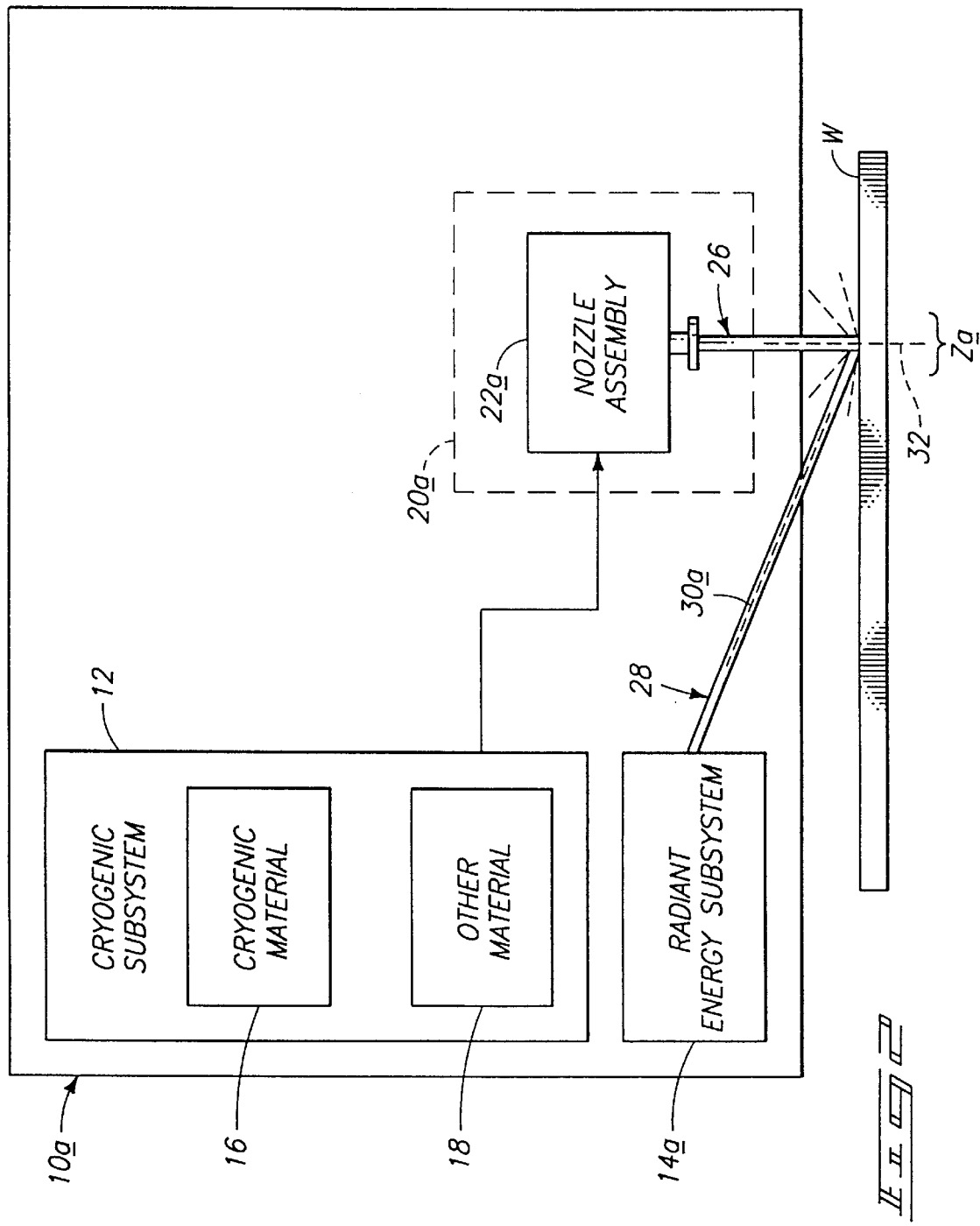

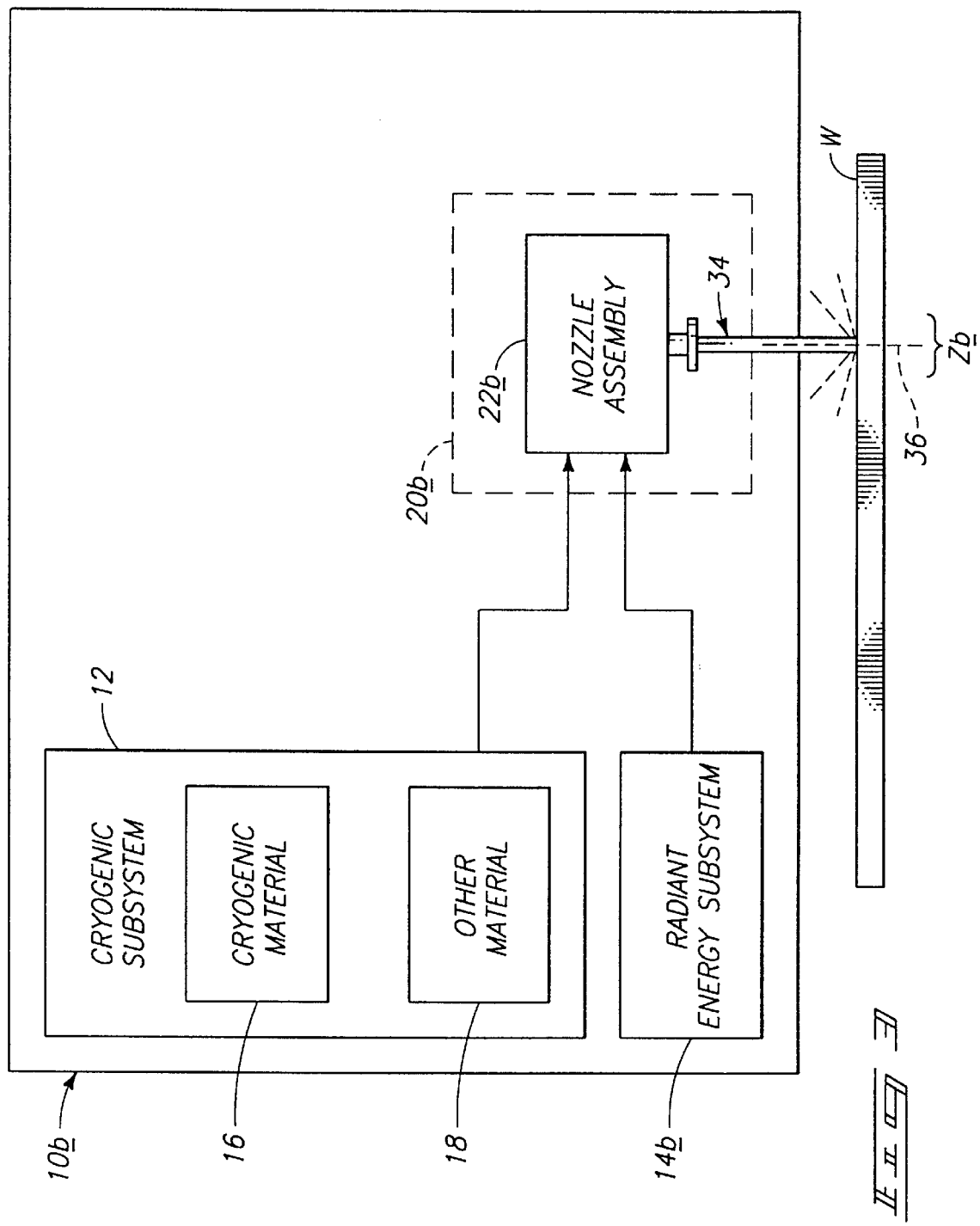

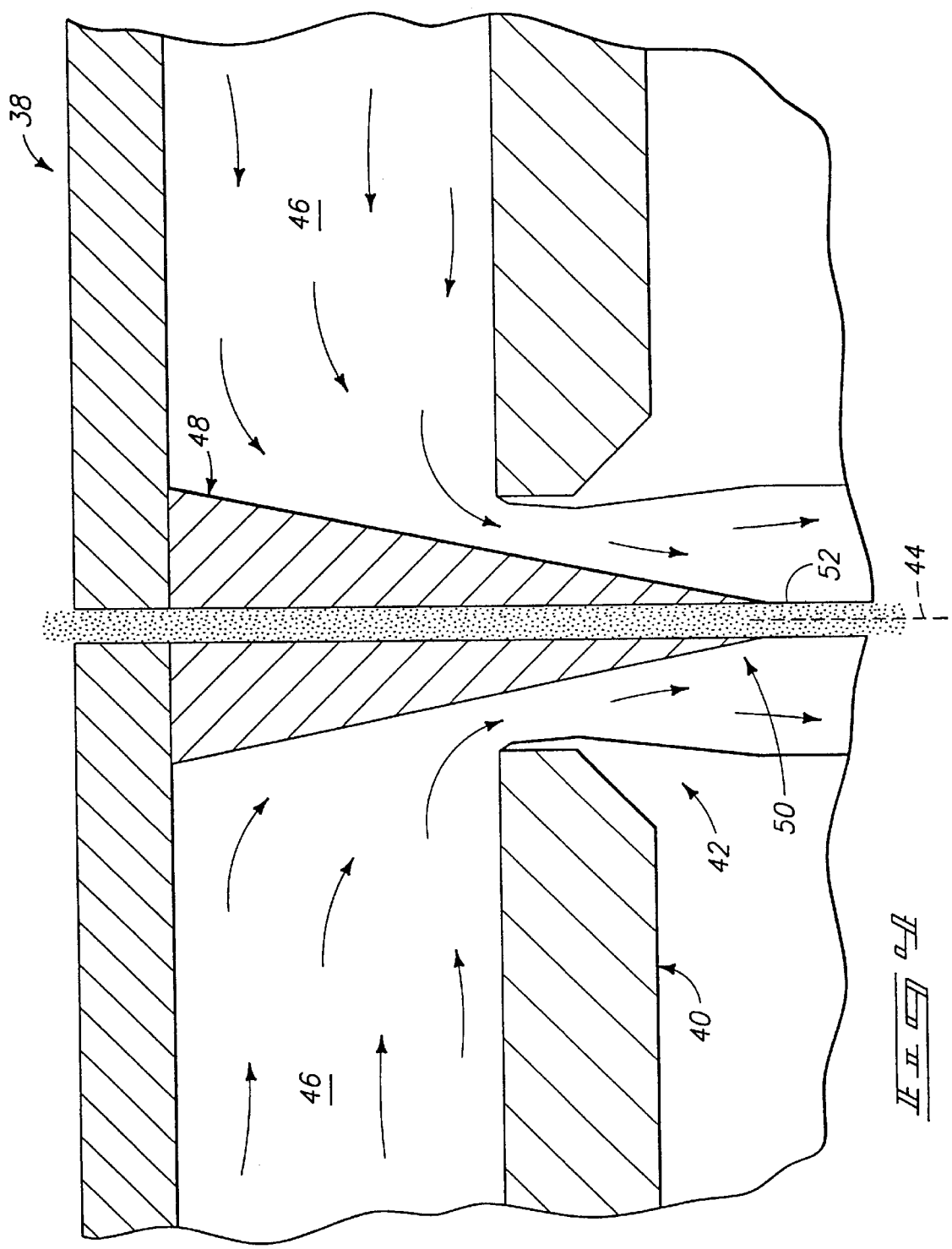

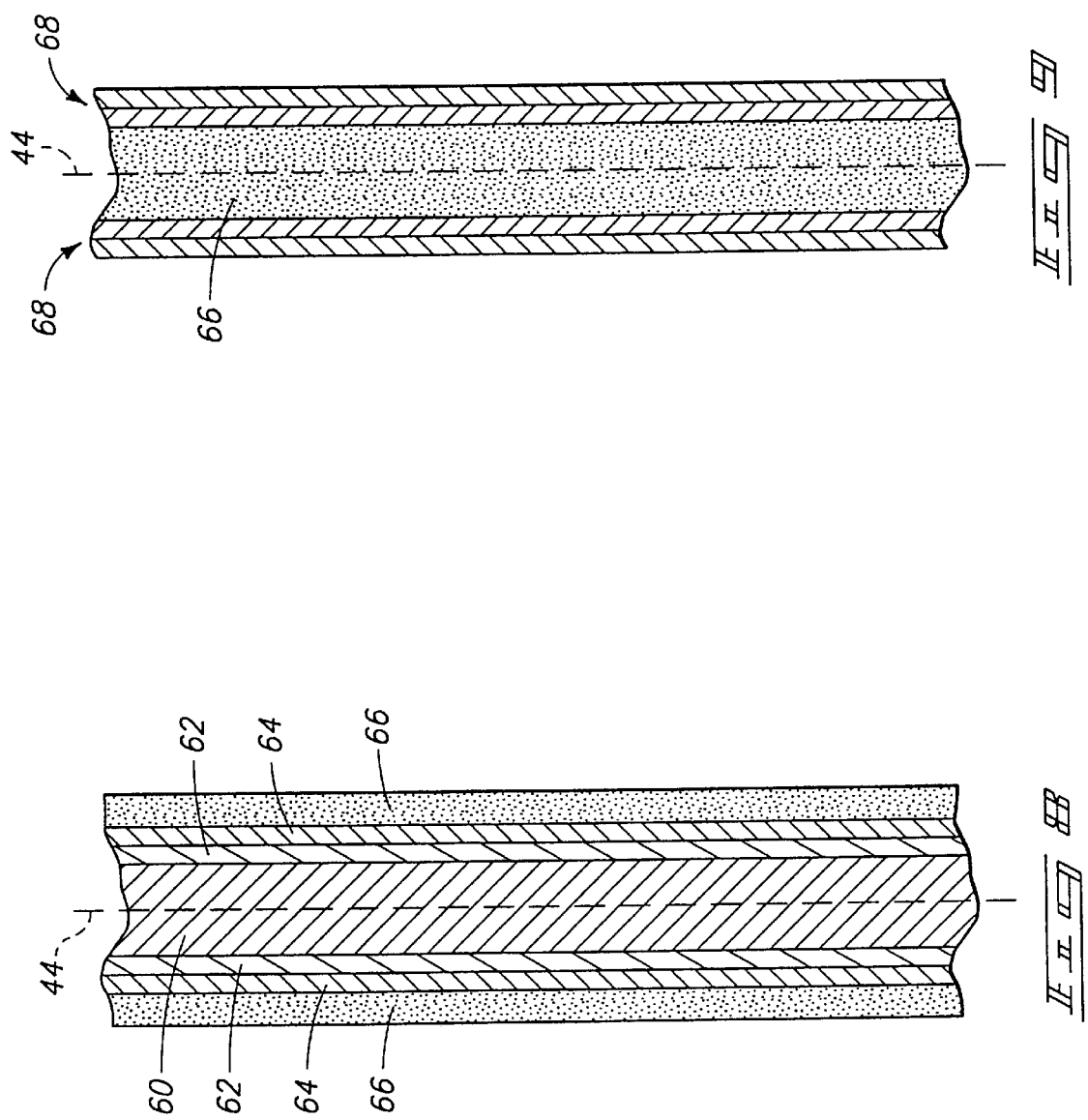

METHODS AND APPARATUSES FOR CUTTING, ABRADING, AND DRILLING

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

TECHNICAL FIELD

This invention relates to methods and apparatuses for cutting, abrading, and drilling. In particular, the invention concerns methods and apparatuses for cutting, abrading, and drilling with radiant energy and sublimable particles.

BACKGROUND OF THE INVENTION

There exist a number of known methodologies and apparatuses for treating the surface of a work piece. For purposes of this document, the term "treatment" or "treating" will be understood to encompass abrading, cutting, polishing, and/or otherwise modifying the surface of a work piece. The term "work piece" will be understood to include any and all materials which can be operated upon by such methods and apparatuses for the purpose of abrading or otherwise treating them.

One type of treatment is referred to as "sandblasting" which is a generic term which is understood to designate any of a series of processes in which small particles are propelled against the surface to effect changes at or on that surface. For example, sandblasting is commonly used to remove unwanted material from the surfaces of objects by abrasion or erosion. However, sandblasting techniques have also been developed which can alter the physical condition of the surface of an object, such as by shot peening. Another technique for abrading or otherwise treating materials is to use a high velocity water jet to achieve the desired surface treatment. Water jets can also be used to cut certain materials, much like a saw.

One drawback with both sandblasting and water jet technologies relates to clean-up or removal of abrasive particles after they have been used. Similarly, water jet technology suffers from problems relating to the collection of the water released during the cutting or abrading operation, as well as problems of possible contamination of the water from the eroded material.

One attempt to solve the above problems relates to the use of sublimable particles, such as dry ice, as an abrasive material. The primary advantage of using sublimable particles (i.e., particles that change directly from a solid to a gas without the transition through the liquid state) in a sandblasting operation is that there is no secondary waste material to be collected. That is, the dry ice particles change to gaseous carbon dioxide ($CO_2$) shortly after striking the surface of the object. The gaseous carbon dioxide can then be discharged into the atmosphere. Since carbon dioxide is present in the atmosphere in substantial quantities, venting the carbon dioxide gas into the atmosphere generally does not pose any problems.

This invention arose out of concerns associated with providing improved methods and apparatuses for surface treatment of a work piece. In particular, this invention arose out of concerns associated with providing improved methods and apparatuses which use sublimable particles to effectuate a desired surface treatment.

SUMMARY OF THE INVENTION

Methods and apparatuses for treating a surface of a work piece are described. In one implementation, a laser delivery subsystem is configured to direct a laser beam toward a treatment zone on a work surface. A cryogenic material delivery subsystem is operably coupled with the laser delivery subsystem and is configured to direct a stream comprising cryogenic material toward the treatment zone. Both the laser beam and stream cooperate to treat material of the work surface within the treatment zone. In one aspect, a nozzle assembly provides the laser beam and stream of cryogenic material along a common flow axis. In another aspect, the laser beam and stream are provided along different axes.

BRIEF DESCRIPTION OF THE DRAWINGS

Preferred embodiments of the invention are described below with reference to the following accompanying drawings.

FIG. 1 is a high-level schematic diagram of an apparatus in accordance with one implementation of the invention. FIG. 1 also illustrates methodical aspects of the invention.

FIG. 2 is a high-level schematic diagram of an apparatus in accordance with another implementation of the invention. FIG. 2 also illustrates methodical aspects of the invention.

FIG. 3 is a high-level schematic diagram of an apparatus in accordance with another implementation of the invention. FIG. 3 also illustrates methodical aspects of the invention.

FIG. 4 is a sectional view of a nozzle assembly constructed in accordance with one implementation of the invention.

FIG. 8 is a sectional view of a combined cryogenic stream and laser beam in accordance with one aspect of the invention.

FIG. 9 is a sectional view of a combined cryogenic stream and laser beam in accordance with one aspect of the invention.

DETAILED DESCRIPTION OF THE PREFERRED EMBODIMENTS

Figure 7:
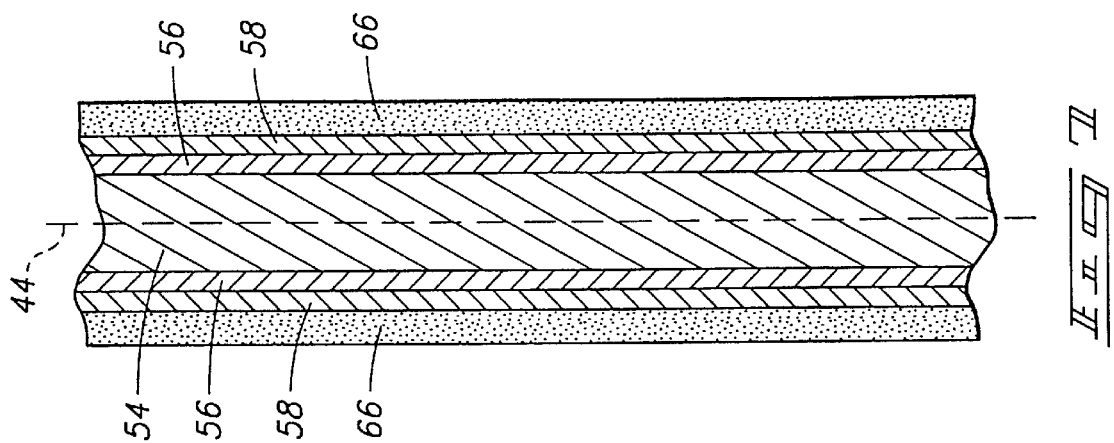
FIG. 7 is a sectional view of a combined cryogenic stream and laser beam in accordance with one aspect of the invention.

Referring to FIG. 1, an apparatus constructed in accordance with a first implementation of the invention is shown generally at 10. Apparatus 10 includes a cryogenic material delivery subsystem 12 and a radiant energy subsystem 14. Cryogenic material delivery subsystem 12 is configured to provide a high velocity stream comprising cryogenic material which can be directed toward a work piece W. As used in this document, the term "cryogenic" will be understood to include those materials provided at a temperature which is less than minus 100° F. An exemplary velocity is around 3400 ft/sec, although other velocities, both higher and lower, are possible. Exemplary cryogenic material delivery systems are described in U.S. Pat. Nos. 5,456,629 and 5,733,174, all of which are assigned to the assignee of this application, the disclosures of which are expressly incorporated herein by reference.

In the illustrated example, subsystem 12 includes one or more sources of cryogenic material 16, as well as a source of so-called "other" material 18. Such "other" material can include cryogenic material, or material which is different from cryogenic material as will become apparent below. A delivery subsystem 20 is provided and includes a nozzle assembly 22 and, in this example, a direction mechanism 24 operably coupled therewith. Various nozzle assemblies are shown and described in the above-incorporated disclosures. The nozzle assemblies can be formed from materials which are suited for the processing conditions mentioned herein. Specifically, materials such as stainless steel, sapphire and industrial diamond can be used to form nozzle assemblies suitable for use in the disclosed operating environments. Other materials can, of course, be used.

Nozzle assembly 22 is operably coupled with cryogenic material delivery subsystem 12 to receive cryogenic material therefrom and provide the same therethrough and in the form of a high velocity stream which can be directed toward work piece W. Directing mechanism 24 is configured to receive radiant energy from radiant energy subsystem 14 and direct such radiant energy toward work piece W. In the illustrated example, subsystem 14 is a laser source or laser delivery subsystem which is operably configured to provide a laser beam 28 which can be directed toward work piece W. Various types of lasers can be incorporated for use with the various implementations of the present invention. For example, subsystem 14 can be configured to provide a pulsed or continuous beam. Moreover, versatility can be enhanced by selecting a laser type which has desirable wavelength characteristics relative to a particular type of workpiece being processed. Specific laser types include a Nd (Neodymium) YAG (Yttrium Aluminum Garnet) Q-switched laser. An exemplary Nd-YAG laser system is disclosed in European Patent Application Publication No. 0 091 646, filed by Westinghouse Electric Corporation, published Oct. 19, 1983, which is incorporated by reference. Other laser types include an excimer laser, $CO_2$ laser and the like. Yet, other exemplary lasers are disclosed in U.S. patent application Ser. No. 08/506,585, assigned to the assignee of this application, the disclosure of which is expressly incorporated herein by reference.

In the illustrated example, laser delivery subsystem 14 provides laser beam 28 along a first axis 30 which is directed toward work piece W. Cryogenic material delivery subsystem 12, and in particular nozzle assembly 22 provides high velocity stream 26 along a second axis 32 which is different from the first axis. The illustrated axes are generally parallel with one another, with the laser beam and stream having respective different origination positions. In one aspect, apparatus 10 is movable through a treatment zone Z on a surface of work piece W such that either one of stream 26 and beam 28 precedes or succeeds the other. In such a manner, a work surface can first be treated with a laser beam and thereafter with a high velocity cryogenic stream, or vice versa. In this way, both the laser beam and the high velocity stream cooperate to treat the surface of work piece W within treatment zone Z.

Cryogenic material delivery subsystem 12 comprises, in the illustrated example, a source of both cryogenic material and so-called "other" material. It is possible, however, for only cryogenic material to be provided. Accordingly, stream 26 produced by nozzle assembly 22 would comprise only such cryogenic material. However, in the illustrated example, other are materials provided which, in combination with the cryogenic material, produce a composite, high velocity stream for use in abrading, cutting, or otherwise treating a work surface area. The delivery system and nozzle assembly disclosed in U.S. Pat. No. 5,456,629 discloses a system for delivering liquid nitrogen, gaseous nitrogen, and gaseous carbon dioxide under various pressures through a so-called tri-state nozzle assembly. Such other materials can include non-cryogenic materials which can be provided at temperatures greater than those which are normally considered to be cryogenic. For example, material can be provided up to temperatures of 400–500° F. and greater. Accordingly, the high velocity stream produced by nozzle assembly 22 would not include cryogenic material. Such material can be used in connection with the present invention. Of course, other materials can be used.

Referring to FIG. 2, an apparatus in accordance with another implementation of the invention is set forth generally at 10a. Like numerals from the above-described embodiment have been utilized where appropriate with differences being indicated by the suffix "a" or with different numerals or letters. Accordingly, radiant energy subsystem 14a is provided and enables a laser beam 28 to be directed along first axis 30a which is generally non-parallel with the second axis 32. In the illustrated example, apparatus 10 enables both laser beam 28 and high velocity stream 26 to be directed toward a common treatment zone $Z_a$ from different, spaced-apart origination positions.

Referring to FIG. 3, an apparatus in accordance with another implementation of the invention is set forth generally at 10b. Like numerals from the above-described embodiment have been utilized where appropriate, with differences being indicated by the suffix "b" or with different letters or numerals. Accordingly, delivery subsystem 20b is configured to receive inputs from both cryogenic material delivery subsystem 12 and radiant energy delivery subsystem 14. Nozzle assembly 22b produces a high velocity stream 34 which includes as constituent parts, both cryogenic material and radiant energy in the form of a laser beam. Accordingly, and in the illustrated example, a laser beam and a high velocity stream comprising the cryogenic material are contemporaneously directed along a common flow axis 36 and toward treatment zone $Z_b$ of work piece W. As will become apparent below, the laser beam can be provided either inwardly or outwardly of the material comprising the stream of cryogenic material. In this manner, a surface of work piece W is treated with both radiant energy and a cryogenic stream of material.

Referring to FIG. 4, a nozzle assembly is shown generally at 38 and is one which is configured in accordance with one implementation of the invention. The nozzle assembly is configured to deliver a high velocity stream comprising at least one cryogenic material. Nozzle assembly 38 includes a first nozzle 40 having an outlet end 42 oriented along a flow axis 44. Cryogenic material 46 is provided into nozzle assembly 38 and out of outlet end 42 along flow axis 44. A second nozzle 48 is provided and includes an outlet end 50 which is oriented along flow axis 44 and configured for directing a laser beam 52 out of outlet end 50 and along flow axis 44. In the illustrated example, laser beam 52 is provided along flow axis 44 and inwardly of cryogenic material 46. It is possible, however, for nozzle assembly 38 to be configured to provide laser beam 52 outwardly of cryogenic material 46. Nozzle assemblies are described in the above-incorporated documents.

Referring to FIGS. 5-9, various stream and/or beam configurations are shown. The various streams can, but need not include one or more abrading materials or particles. Such can be provided by the apparatuses and methods described and/or incorporated by reference above.

Figure 5:
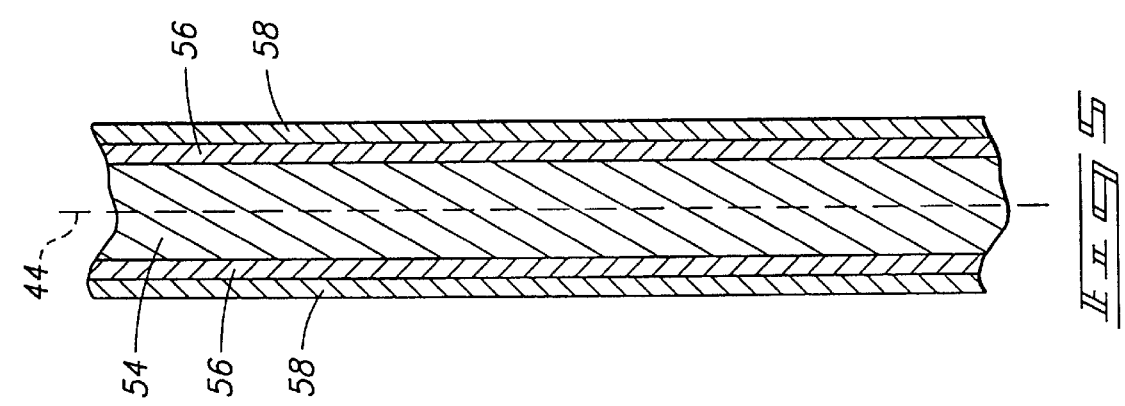
FIG. 5 is a sectional view of a cryogenic stream in accordance with one aspect of the invention.

FIG. 5 shows a stream in which a gaseous material is provided outwardly of at least one cryogenic material. Alternately, such stream shows at least one cryogenic constituent disposed inwardly of at least one other constituent.

In the illustrated example, the stream comprises cryogenic nitrogen 54, a mixture 56 of nitrogen gas and $CO_2$ outwardly of cryogenic nitrogen 54, and a shield gas 58 of nitrogen. Here, the $CO_2$ is utilized as an abrading particle. Other standard abrading particles can be used in conjunction with this stream and the other streams and/or embodiments. For example, all of the standard water jet abrasives could be used as will be apparent to those of skill in the art.

Figure 6:
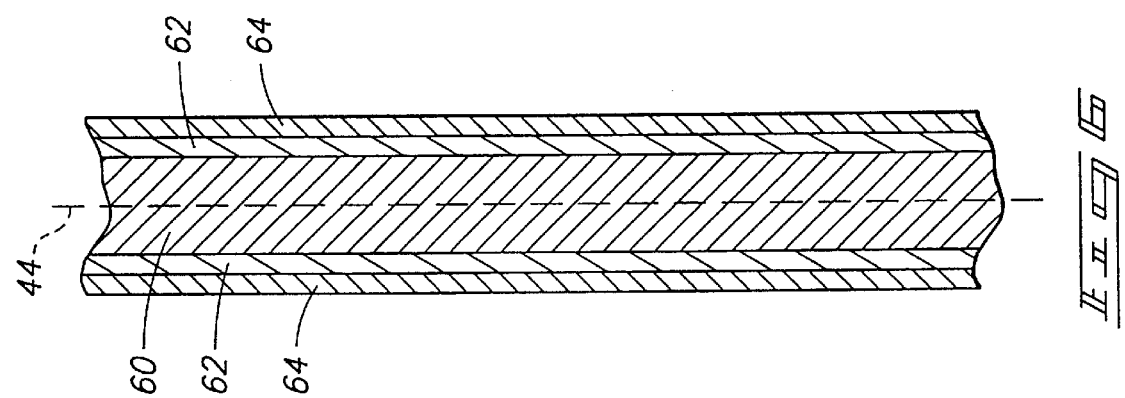
FIG. 6 is a sectional view of a cryogenic stream in accordance with another aspect of the invention.

FIG. 6 shows a stream in which at least one other constituent is disposed inwardly of a cryogenic constituent. In the illustrated example, the stream comprises a mixture 60 of liquid nitrogen and $CO_2$, cryogenic nitrogen 62 outwardly of mixture 60, and a shield gas 64 of nitrogen. The $CO_2$ is preferably in the form of particles which are suspended within the liquid nitrogen and serve an abrading function.

FIG. 7 shows a combination stream/laser beam in which a laser beam 66 is directed through the nozzle assembly and along flow axis 44. In the illustrated example, the stream/laser beam has constituent parts as set forth in FIG. 5, with a laser beam 66 provided outwardly of the stream constituents.

FIG. 8 shows a combination stream/laser beam having constituent parts as set forth in FIG. 6, with a laser beam 66 provided outwardly of the stream constituents and along flow axis 44.

FIG. 9 shows a combination stream/laser beam having a laser beam 66 provided inwardly of cryogenic stream 68. Stream 68 can have any of the configurations described above, and others as well.

In each of the above-described streams or stream/beam configurations (FIGS. 5–9), the nozzle assembly is configured to provide a high velocity stream comprising more than one constituent in addition to the cryogenic nitrogen, e.g. a composite stream. It will be understood, however, that such nozzle assembly could provide only a cryogenic material without any other material. Where multiple constituents are provided by the nozzle assembly, whether such constituents comprise cryogenic material, a laser beam, and the like, such are provided to be coaxially disposed about flow axis 44. Preferably, at least one of the constituents is sublimable. Exemplary nozzle assemblies having plural nozzles with different outlet ends which are capable of providing suitable streams are described in the disclosures incorporated by reference above.

Additionally, although the invention has been described in the context of providing a cryogenic stream of material with a laser beam to effectuate work upon a workpiece, it will understood that other streams of material can be utilized in connection with the above-described laser such as gas-phase material above temperatures which conventionally support cryogenic material.

In use, apparatuses and methods in accordance with the invention enable a workpiece to be cut, abraded, polished or otherwise treated with treatment media which effectively leaves no trace that it was ever there. In a preferred implementation, both the laser and the stream do some work associated with the workpiece. Additionally, the invention can have advantages insofar as a treatment regime in which gaseous molecules of a material are forced into the surface of a workpiece by the stream and subsequently (or concurrently) acted upon by the laser to produce a desired result. Such can be employed in particular applications to reduce the surface friction of a workpiece. Alternately, such can be employed to roughen the surface of a workpiece. For example, the laser can, with some abrading materials, be utilized to fuse such material together with a workpiece surface to provide an imbedded surface. Diamond dust is one type of material which can be imbedded into the surface of a workpiece. Depending on the nature of the material to be imbedded, the surface can be more or less rough. Graphite is but one example of a material which can be desirably imbedded into a surface using the inventive methodologies to provide a lubricated surface. In short, applications of the present invention are numerous and include those within the cutting technology field whenever a zero secondary waste stream is required or desired. This includes applications in light and heavy manufacturing industries, food industries, lumber industries, transportation industries and many more.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A surface treatment method comprising:
   directing a laser beam toward a treatment zone on a work surface; and
   providing a stream of cryogenic material within the treatment zone on the work surface while directing the laser beam, said beam and cryogenic material cooperating to treat work surface material within said treatment zone, wherein directing the laser beam and providing the stream of cryogenic material comprises directing said beam and said cryogenic material along a common flow axis toward said treatment zone, wherein directing a laser beam comprises directing a laser beam from a laser chosen from a group consisting of neodymium yttrium aluminum garnet lasers, excimer lasers and carbon dioxide lasers.

2. A surface treatment method comprising:
   treating a work surface portion with radiant energy; and
   treating the work surface portion with a stream of material comprising at least one cryogenic constituent, the stream of cryogenic material being directed at right angles to the work surface portion, wherein treating a work surface portion with radiant energy comprises treating a work surface portion with a laser beam from a laser chosen from a group consisting of neodymium yttrium aluminum garnet lasers, excimer lasers and carbon dioxide lasers.

* * * * *